United States Patent [19]

Bui

[11] Patent Number: 4,831,578
[45] Date of Patent: May 16, 1989

[54] BINARY ADDER

[75] Inventor: Tuan H. Bui, Jamesburg, N.J.

[73] Assignee: Harris Semiconductor (Patents) Inc., Melbourne, Fla.

[21] Appl. No.: 802,018

[22] Filed: Nov. 25, 1985

[51] Int. Cl.[4] .............................. G06F 7/50
[52] U.S. Cl. .................................. 364/784
[58] Field of Search .............. 364/784–788; 307/471, 472

[56] References Cited

U.S. PATENT DOCUMENTS

| 4,417,314 | 11/1983 | Best ................................ 364/785 |
| 4,601,007 | 7/1986 | Uya et al. ........................ 364/784 |
| 4,621,338 | 11/1986 | Uhlenhoff ........................ 364/784 |
| 4,718,035 | 1/1988 | Hara et al. ...................... 364/784 |
| 4,730,266 | 3/1988 | Van Meerbergen et al. ...... 364/784 |

OTHER PUBLICATIONS

Weste et al., *Principles of CMOS VLSI Design*, pp. 317–319, 1985, Addison–Wesley.

Primary Examiner—Gary V. Harkcom
Assistant Examiner—Dale M. Shaw
Attorney, Agent, or Firm—Henry Schanzer

[57] ABSTRACT

A binary adder stage in which the two binary inputs are logically combined to produce the Exclusive-OR, the Exclusive-NOR, the NAND and the NOR functions of the two inputs. The carry-input signal is then used to control the generation of the sum output and the carry-output. When the carry-input signal has one binary value, the Exclusive-OR function and the AND function of the binary inputs are produced at the SUM and $C_{OUT}$ outputs. When the carry-input signal has the other binary value the Exclusive-NOR function and the OR function of the two binary inputs are produced at the SUM and $C_{OUT}$ outputs.

8 Claims, 6 Drawing Sheets

BINARY ADDER

This invention relates to binary adders and, in particular, to a full binary adder.

To better understand the description of the invention to follow, reference is first made to FIG. 1 which is a simplified block diagram of a system in which the respective outputs (A0, A1, A2, A3 and B0, B1, B2, B3) of two analog-to-digital (A/D) converters are fed to a serial adder chain comprised of four (4) full binary adder stages. Typically, each adder stage includes two inputs to which are supplied two binary input signals (e.g. A and B) and a third input to which is applied a carry-input signal ($C_{IN}$). The full adder stage also includes means responsive to these inputs for producing a sum output (SUM) and a carry-out output ($C_{OUT}$ or CARRY output) conforming to the values set forth in truth Table 1 below.

TABLE 1

| A | B | $C_{IN}$ | SUM | $C_{OUT}$ |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

The combination of what is termed the SUM and the CARRY outputs forms a two digit number which is the "actual" sum of the three binary inputs A, B and $C_{IN}$. As is well known, the SUM column represents the sum of A, B and $C_{IN}$ so long as the sum can be represented by a single digit. When the sum is larger than can be represented by a single digit, the SUM column gives the digit in the result which is of the same significance as the individual digits being added. The $C_{OUT}$ column gives the digit which must be carried to the place of next higher significance.

The SUM output (S0, S1, S2, S3) of each adder stage is fed to some utilization device (not shown), while the CARRY output (C1, C2, C3, C4) of each stage is applied to the carry-in ($C_{IN}$) input of a succeeding stage. Since the carry-out signal of a stage must be supplied to a subsequent stage to complete the data inputs to that stage it is evident that the carry-out signal of each stage should be produced with as little propagation delay as possible. Also, the carry-out signal must be capable of driving the succeeding stage and, therefore, it must be a "strong" signal. Depending on the type of utilization device, the demands placed on the SUM output may not be as critical as those placed on the CARRY output. However, as a general proposition, the SUM output should also be produced with as little delay as possible and preferably at about the same time as $C_{OUT}$.

A prior art full adder stage shown in FIGS. 8.8 and 8.9 at page 318 of PRINCIPLES OF CMOS VLSI DESIGN edited by Neil H. E. Weste and Kamran Eshragian and published by Addison-Wesley Publishing Company, copyright 1985, is reproduced in FIG. 2. The circuit uses few components, but it suffers in that the $\overline{\text{SUM}}$ and $\overline{\text{CARRY}}$ outputs are produced by means of transmission gates TGA, TGB, TGC and TGD which are controlled by the Exclusive-OR and Exclusive-NOR functions of A and B. The problem with this design is that the Exclusive-OR and Exclusive-NOR functions are produced, under worst case conditions, with two propagation delays (i.e. $2\tau$) from the time A and/or B change state. In the discussion to follow, it is assumed that the inverters and logic gates have one propagation delay $\tau$, while a turned-ON transmission gate has a delay d, which is significantly less than $\tau$. For example, the inversion of A to produce $\overline{A}$ requires one propagation delay and the production of either the Exclusive-OR or the Exclusive-NOR function of A and B requires another propagation delay. Consequently, the signals $\overline{C_{IN}}$, $C_{IN}$, and $\overline{B}$ applied to the inputs of gates TGA, TGB, TGC and TGD will not be passed via the transmission gates until a time $2\tau$ has elapsed since A and/or B changed state. Furthermore, it is only when the output signals of the Exclusive-OR and Exclusive-NOR gates reach their full steady state values (i.e. ground or $V_{DD}$) that those of their corresponding transmission gates which are to be turned-ON, are in fact ON and driven to their lowest impedance condition. It is only then that the transmission gates allow the propagation of a signal between their inputs and outputs with little delay. Since the Exclusive-OR [A⊕B] and Exclusive-NOR [$\overline{A \oplus B}$] signals applied to the gate electrodes of the transmission gates are produced $2\tau$ after the A and B signals changed state, an additional propagation delay is needed to pass the signal through the transmission gate. Hence the $\overline{\text{SUM}}$ and $\overline{\text{CARRY}}$ signals in FIG. 2 may be produced more than two propagation delays after A and/or B changed state. Finally, the $\overline{\text{SUM}}$ and $\overline{\text{CARRY}}$ outputs have to be inverted, whereby the SUM and CARRY outputs are valid more than three propagation delays after A and/or B change state or are applied to the adder stage.

The delay introduced into the adder circuit by controlling the coupling transmission gates (TGA, TGB, TGC and TGD) with the Exclusive-OR [A⊕B] and Exclusive-NOR [$\overline{A \oplus B}$] signals is avoided in circuits embodying the invention. Rather, in circuits embodying the invention, the carry-in signal is used to control the conductivity of the coupling transmission gates, whereby the transmission gates are driven to their full conductivity, low impedance, condition prior to or concurrently with the generation of the Exclusive-OR [A⊕B] and the Exclusive-NOR [$\overline{A \oplus B}$] functions.

Applicant's invention resides, in part, in the recognition that: (a) when The carry-input signal ($C_{IN}$) is low, the SUM output is equal to the Exclusive-OR function of inputs A and B and the CARRY output is equal to the AND function of A and B; (b) when $C_{IN}$ is high, the SUM output is equal to the Exclusive-NOR function of inputs A and B and the CARRY output is equal to the OR function of A and B. Applicant's invention also resides in implementing the adder circuitry by generating the Exclusive-OR, the Exclusive-NOR, the NAND and the NOR functions of inputs A and B and using the carry-in signal $C_{IN}$ to automatically control the propagation of the appropriate ones of these four functions to the SUM and CARRY outputs.

Figure 1:
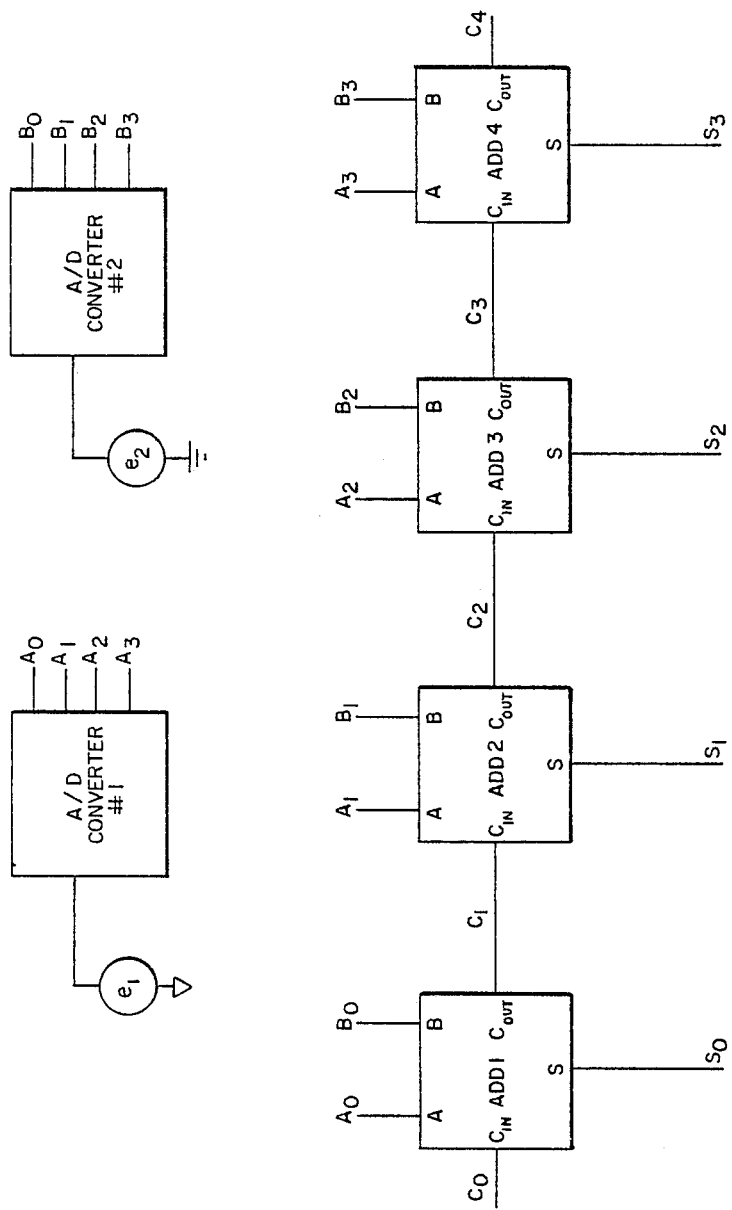
FIG. 1 is a block diagram of a system in which the binary outputs of two analog-to-digital converters are applied to a serial adder chain.
Figure 2:
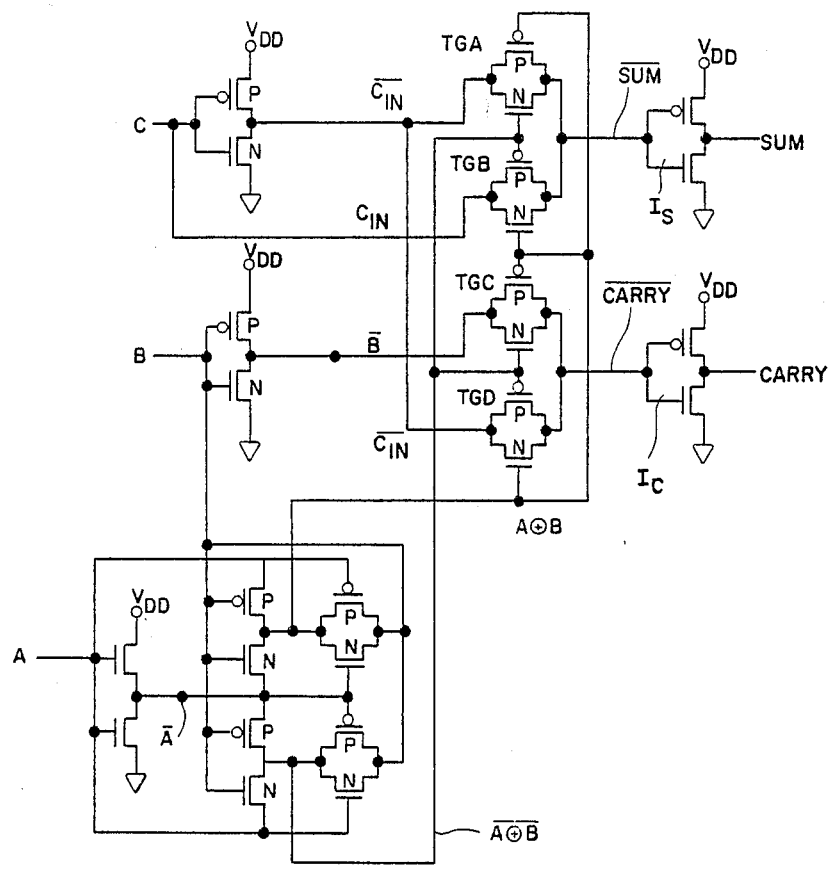
FIG. 2 is a schematic diagram of a prior art adder stage.

Applicants invention may be best appreciated by reference to truth table 2, below, in which the terms have been rearranged to indicate the values of the SUM output and the "$C_{OUT}$" output when $C_{IN}$ is low ("0") and when $C_{IN}$ is high ("1"). Rearranged truth table 2 reveals that: (a) when $C_{IN}$ is low, the SUM output is equal to the Exclusive-OR function of the A and B inputs and $C_{OUT}$ is equal to the AND function of the A and B inputs; and (b) when $C_{IN}$ is high, the SUM output is equal to the Exclusive-NOR function of A and B and $C_{OUT}$ is equal to the OR function of A and B.

TABLE 2

| $C_{IN}$ | A | B | SUM | $C_{OUT}$ |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

The invention is best explained by reference to the circuit of FIG. 3 which includes:

(1) 3 input lines, 4, 6, 8, to which are respectively applied a carry-in ($C_{IN}$) signal, a first (A) binary input signal and a second (B) binary input signal. The $C_{IN}$ signal may be the CARRY output of a previous stage or any binary valued control signal. Inputs A and B may be any arbitrary signals which are to be added together and with $C_{IN}$.

(2) The $C_{IN}$ signal is applied to the input of an inverter I1 at whose output is produced the $\overline{C_{IN}}$ signal, which is the complement of $C_{IN}$.

(3) The A input is applied to the input of an inverter I2 at whose output is produced the $\overline{A}$ signal, which is the complement of A;

(4) a logic gate 10 having inputs 11, 17 and 13 to which are respectively applied the A, B and $\overline{A}$ signals for producing at its output 15 a signal Z1 which represents the Exclusive-OR (X-OR) function of the two binary inputs A and B;

(5) a logic gate 12, structurally similar to gate 10, having inputs 11, 17 and 13 to which are respectively applied the $\overline{A}$, B and A signals, for producing at its output 15 a signal Z2 which represents the Exclusive-NOR (X-NOR) function of the two binary inputs, A and B;

(6) A NAND gate 14 responsive to binary inputs A and B for producing an output signal Z3 which is the logical NAND function of A and B;

(7) a NOR gate 16 responsive to binary inputs A and B for producing an output signal Z4 which is the logical NOR function of the A and B inputs.

Figure 3:
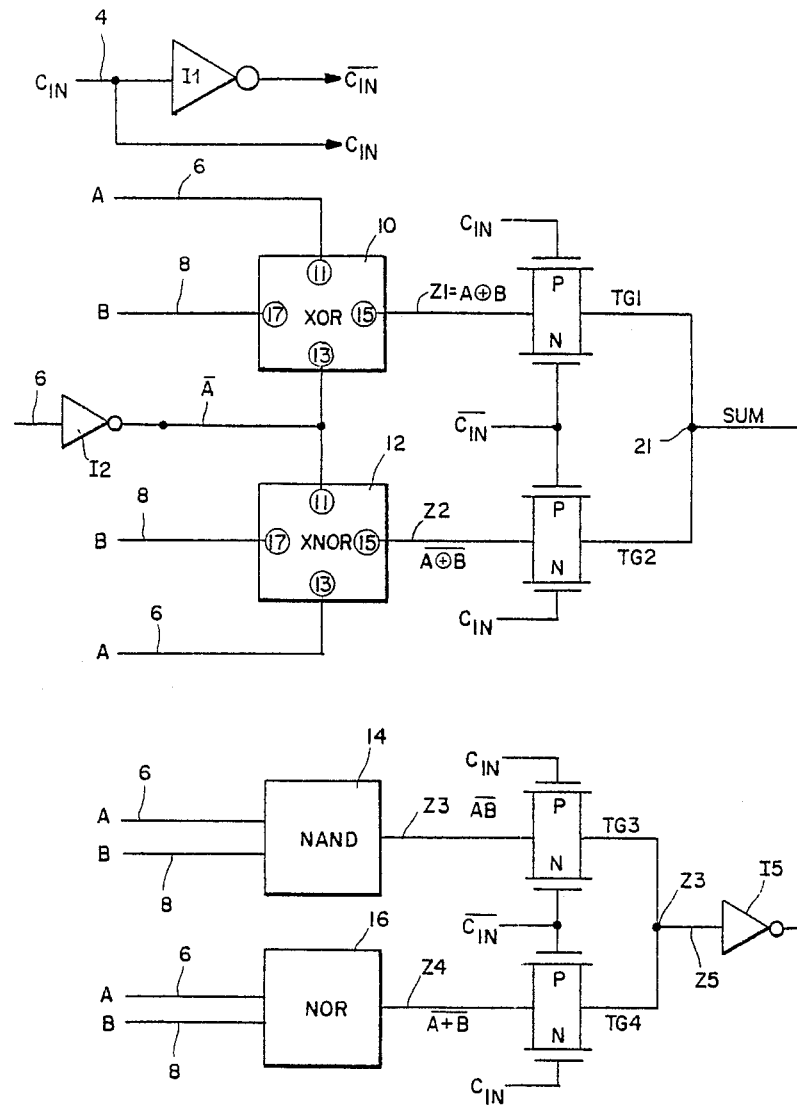
FIG. 3 is a block diagram of an adder stage embodying the invention.

The circuit of FIG. 3 also includes:

(1) a transmission gate TG1 for selectively coupling the output signal Z1 of gate 10 to a node 21 designated the SUM output node;

(2) a transmission gate TG2 for selectively coupling the output signal Z2 of gate 12 to node 21;

(3) a transmission gate TG3 for selectively coupling the output signal Z3 to an intermediate node 23;

(4) a transmission gate TG4 for selectively coupling the output signal Z4 to node 23.

Node 23 is connected to the input of an inverter I5 at whose output is produced the carry-out signal ($C_{OUT}$).

Transmission gates TG1, TG2, TG#and TG4 are complementary transistor transmission gates. That is, they each include two transistors of complementary conductivity type (one P-type transistor and one N-type transistor) having their conduction paths connected in parallel. Each transmission gate is turned-ON or closed when a "low" (logic "0" or ground) signal is applied to the gate electrode of its P-conductivity type transistor and a "high" (logic "1" or $V_{DD}$) signal is applied to the gate electrode of its N-conductivity type transistor. Each transmission gate is turned-OFF or open when a high signal is applied to the gate electrode of its P-conductivity type transistor and a low signal is applied to the gate electrode of its N-type transistor. In the circuit of FIG. 3, the turn-on and turn-off of transmission gates TG1, TG2, TG3 and TG4 is controlled by the carry-in ($C_{IN}$) and $\overline{C_{IN}}$ signals. $C_{IN}$ is applied to the gate electrodes of the P-type transistors of gates TG1 and TG3 and to the gate electrodes of the N-conductivity type transistors in gates TG2 and TG4. $\overline{C_{IN}}$ is applied to the gate electrodes of the P-type transistors in gates TG2 and TG4 and to the gate electrodes of the N-conductivity type transistors in gates TG1 and TG3.

Consequently, when $C_{IN}$ is low, TG1 and TG3 are turned-ON and TG2 and TG4 are turned-OFF and when $C_{IN}$ is high, TG1 and TG3 are turned-OFF and TG2 and TG4 are turned-ON. Thus, when $C_{IN}$ is low, the signal Z1 is coupled via transmission gate TG1 to node 21 whereby the SUM output is equal to the Exclusive-OR logic function of A and B, and the output Z3 is coupled via transmission gate TG3 to node 23 whereby after inversion through I5 the logical AND function of signals A and B is produced as $C_{OUT}$. With $C_{IN}$ lo, TG2 and TG4 are turned-OFF and output Z2 and Z4 are decoupled from output nodes 21 and 23.

When $C_{IN}$ goes high, transmission gates TG2 and TG4 are turned-ON and transmission gates TG1 and TG3 are turned-OFF. When $C_{IN}$ is high, the Exclusive-NOR function of A and B is generated at the SUM output while $C_{OUT}$ is equal to the logical OR function of A and B.

In the circuit of FIG. 3, transmission gates TG1, TG2, TG3 and TG4 are controlled by the signals $C_{IN}$ and $\overline{C_{IN}}$. The signal $C_{IN}$ applied to the first stage of the adder is present contemporaneously with, or prior to, the application of the A and B signals, and $\overline{C_{IN}}$ is generated one gate delay after $C_{IN}$ is present. Consequently, the control signals to transmission gates TG1, TG2, TG3 and TG4 are generated at the time, or before the time, needed to pass or inhibit the logical signals Z1, Z2, Z3 and Z4 produced at the outputs of gates 10, 12, 14 and 16. Consequently, as detailed below, those gates, which are to be turned-ON, are turned-ON just prior to the arrival of the Z1, Z2, Z3 or Z4 signals which, when they arrive, can then pass through their respective gate with a low propagation delay "d".

Figure 4A:
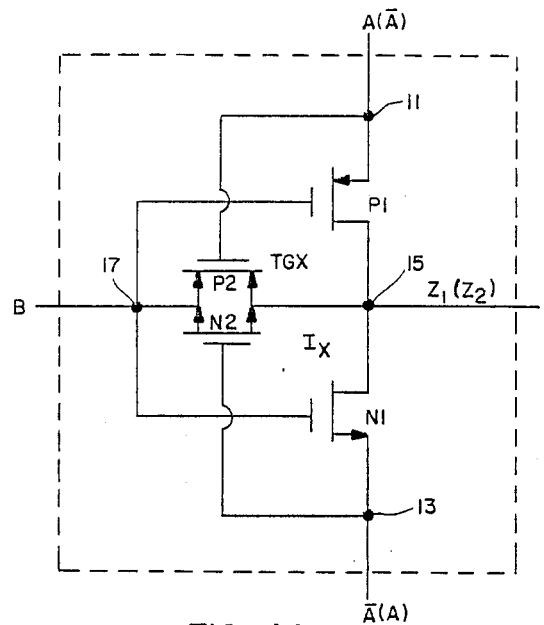
FIG. 4A is a schematic diagram of an Exclusive-OR gate suitable for use in the circuit of FIG. 3.

Gates 10 and 12 may be of the type shown in FIG. 4A. The logic gate shown in FIG. 4A includes insulated-gate field-effect transistors (IGFETs) Pa and N1 having their source electrodes connected to nodes 11 and 13, respectively, and their drains connected in common to an output node 15. The conduction paths of two complementary IFGETs P2 and N2, forming a transmission gate TGX, are connected in parallel between output node 15 and an input node 17. The gate electrodes of P1 and N1 are also connected to node 17 while the gate electrode of P2 is connected to node 11 and the gate electrode of N2 is connected to node 13. When the signal applied to node 11 is high (logic "1" or $V_{DD}$) and the signal applied to node 13 is low (logic "0" or ground) IGFETs P1 and N1 function as an inverter, IX, and transmission gate TGX, comprised of P2 and N2, is turned-OFF. When the signal applied to node 11 is low and the signal applied to node 13 is high, P1 and N1 are non-conducting while transmission gate TGX is turned-ON (i.e. P2 and N2 are turned-ON). The application of signals A, B and $\overline{A}$ to terminals 11, 17 and 13, respectively, as shown for gate 10 in FIG. 3, results in the production of the Exclusive-OR function (Z1) of A and B at node 15. The application of signals $\overline{A}$, B and A, respectively, to nodes 11, 17 and 13 of gate 12 as shown for gate 12 in FIG. 3 results in the production of the Exclusive-NOR function (Z2) of A and B at node 15.

Thus, when A applied to node 11 is high and $\overline{A}$ applied to node 13 is low, Z1 is equal to $\overline{B}$, the inverse of B. When A applied to node 11 is low and $\overline{A}$ applied to node 13 is high, Z1 is equal to B. Hence, Z1 is high when A and B are different and is low when A and B are the same which is equal to the Exclusive-OR function of A and B.

It can similarly be shown that when $\overline{A}$ is applied to node 11 and A is applied to node 13, that Z2 is high when A and B are the same and Z2 is low when A and B are different which defines the Exclusive-NOR function of A and B.

Figure 4C:
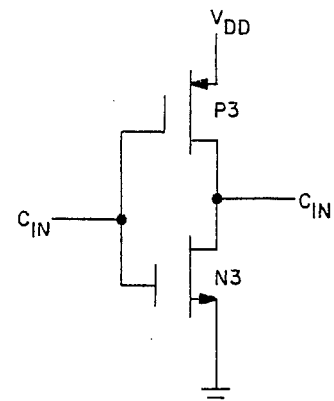
FIGS. 4B, 4C and 4D are the respective schematic diagrams of a complementary NAND gate, complementary inverter, and complementary NOR gate suitable for use in the circuit of FIG. 3.
Figure 4B:
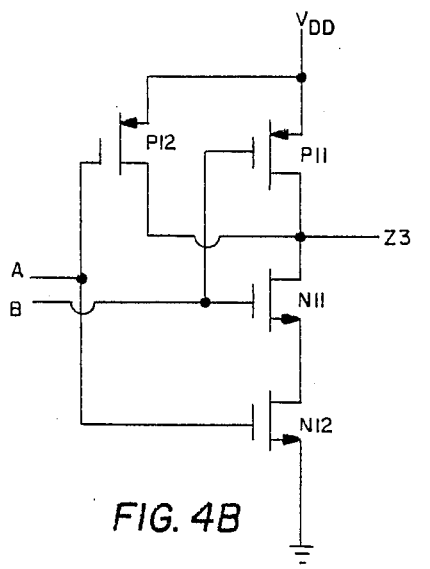

Logic gate 14 may be a two input NAND gate, comprised of two P-type IGFETs connected in parallel and two N-type IGFETs connected in series, as shown in FIG. 4B. The circuit is well known and need not be detailed. Suffice it to say, that it is only when A and B are 60th high that the output (Z3) is low. When either one or both of A and B is low, the output (Z3) is high.

Figure 4D:
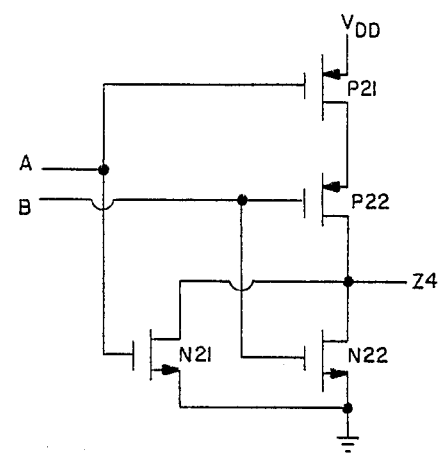

Logic gate 16 may be a two input NOR gate comprised of two P-type IGFETs connected in series and two N-type IGFETs connected in parallel, as shown in FIG. 4D. This circuit is also well known and need not be detailed. It is only when A and B are both low that the output (Z4) is high. When either one or both of A and B is high the output (Z4) is low.

Inverters I1, I2 and I5 may be a complementary inverter of the type shown in FIG. 4C, which is well known and need not be detailed.

Logic gates employing transistors of complementary conductivity type are preferred for use where low power consumption and high noise immunity is desired. However, it should be appreciated that any suitable logic gates capable of providing the Exclusive-OR, Exclusive-NOR, NAND or NOR functions could be used in the circuit of FIG. 3.

The propagation of the signals in the circuit of FIG. 3 will now be examined using the following simplifying assumptions: (1) the propagation delay through each one of the inverters and via each one of gates 14 and 16 is assumed to be equal to a single propagation delay, $\tau$. However, in fact, the propagation delay through the two input NAND gate 14 and the two-input NOR gate 16 would normally be greater than through a simple inverter: and (2) the propagation delay through a turned-ON transmission gate is equal to "d" which is much smaller than $\tau$. The turned-ON transmission gate may be viewed as an RC network, with R being equal to the low ON resistance of the transmission gate. However, when a transmission gate is being turned-ON, its impedance goes from a very high value to the low ON resistance value. Thus, a signal being propagated by a transmission gate which is being turned-ON will be propagated with a significantly greater delay than "d".

Assuming $C_{IN}$ to be available at the same time as a change in A or B, which is assumed to occur at a time $t_O$, $\overline{C_{IN}}$ is available a time $\tau$ after $t_O$. Since $C_{IN}$ and $\overline{C_{IN}}$ are used to control the conductivity of the transmission gates, TG1, TG2, TG3 and TG4, it may be assumed that at time $t_O + \tau$, either TG1 and TG3 are turned-ON and TG2 and TG4 are turned-OFF, or TG1 and TG3 are turned-OFF and TG2 and TG4 are turned-ON, depending on whether $C_{IN}$ is high or low.

Starting with time $T_O$, the change of state in A and/or B is propagated via inverter I2 and gates 10, 12, 14 and 16. The propagation delay via NAND gate 14 or NOR gate 16 is assumed equal to $\tau$. Thus Z3 and Z4 are produced a time $\tau$ after a change in A and/or B. After Z3 and Z4 have reached their stable and valid levels, they are propagated via whichever one of TG3 or TG4 is turned-ON with a propagation delay "d" to node 23, producing outut Z5. Z5 is applied to inverter I5 to produce the $C_{OUT}$ signal with a propagation delay of $\tau$. Thus, the $C_{OUT}$ signal is produced and is valid a time $2\tau + d$ after a change in A or B.

The propagation delay via gates 10 and 12 may better be evaluated by first noting that $\overline{A}$ is produced via inverter I2, a time delay $\tau$ after a change in A. The remaining propagation delay is more easily understood by referring to FIG. 4A. Assume, for example, that the signal B is applied to node 17 and that A and $\overline{A}$ are applied to nodes 11 and 13, respectively. When A and $\overline{A}$ are high and low respectively, TGX is turned-OFF while P1 and N1 function as a complementary inverter IX. The B input applied to the input of inverter IX causes the signal Z1 produced at the output node 15 of the gate to equal $\overline{B}$ and to be produced and stable at the output of IX with a propagation delay, via IX, equal to $\tau$. Thus, a propagation delayof $2\tau$ is needed from the time A and/or B change state until a valid output is produced at node 15. When A and $\overline{A}$ are low and high, respectively, TGX is turned-ON and the signal B present at node 17 is propagated via TGX to node 15 with a propagation delay "d" which is significantly less than $\tau$. Therefore to produce a valid and stable Z1 or Z2 output via I2, and gates 10 or 12 requires, under worst case conditions, a time of $2\tau$.

Referring back to FIG. 3, it becomes evident that, when Z1 and/or Z2 are generated, either TG1 and TG3 are fully turned-ON or TG2 and TG4 are fully turned-ON. Henc, when Z1 and/or Z2 are produced at the outputs of gates 10 and 12, respectively, they will be propagated to SUM output node 21 with a propagation delay of "d". Thus, the propagation delay involved in the production of the SUM output is at most equal to $2\tau + d$, where "2" includes the delay through inverter I2 and gates 10 or 12 and "d" includes the delay through TG1 or TG2.

Consequently, the propagation delays for the production of the SUM and $C_{OUT}$ outputs are similar.

Figure 5:
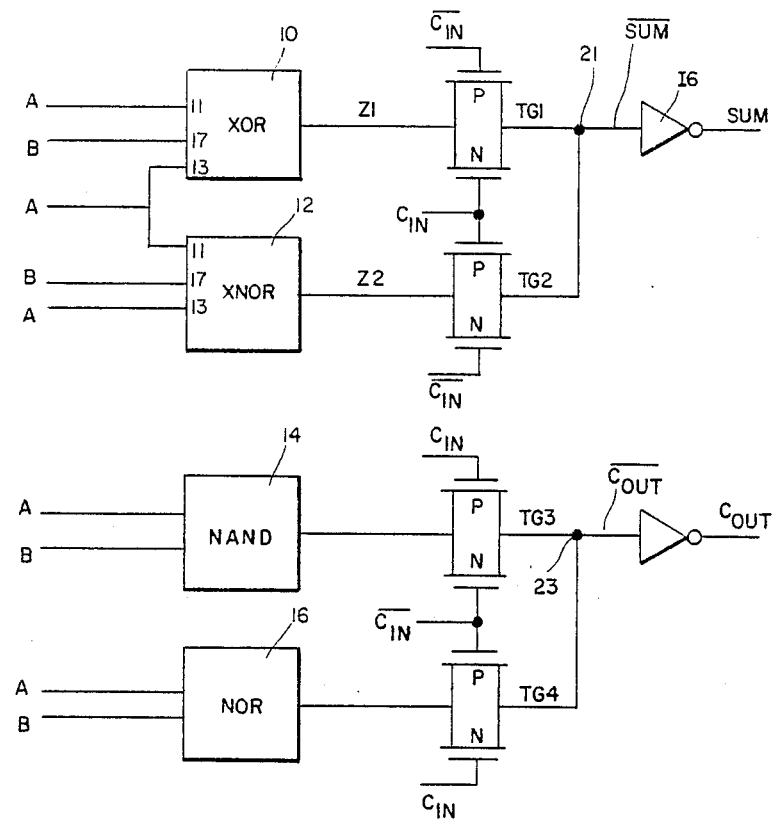
FIG. 5 is a block diagram of another adder stage embodying the invention.

In the circuit of FIG. 3, for the condition when A is low and $\overline{A}$ is high, the signal B is propagated from node 17 to node 15 of gate 10 via transmission gate TGX, which is internal to the gate, to produce the signal Z1. The signal Z1 may then be propagated via TG1 to the SUM output node. If the SUM output node is not fed into a high impedance buffer, there may be some loading on the SUM output since it is produced by propagation through two transmission gates. This may result in the nodal capacitance being charged or discharged relatively slowly, decreasing the speed of the adder. To avoid this potential problem, the circuit of FIG. 3 may be modified as shown in FIG. 5. Here, Z1, the output of gate 10, is coupled to node 21 via TG1, which is turned-ON when $C_{IN}$ is high, and Z2 is coupled to node 21 via TG2, which is turned-ON when $C_{IN}$ is low. Consequently, a signal which is logically equivalent to $\overline{SUM}$ is produced at node 21. The output of node 21 is then connected to the input of an inverter I6 to produce the SUM output at the output of inverter I6. The inverter adds a delay $\tau$ and the SUM output and $C_{OUT}$ now have different propagation delays. But, this is offset by the SUM signal being capable of driving its output faster.

Figure 6:
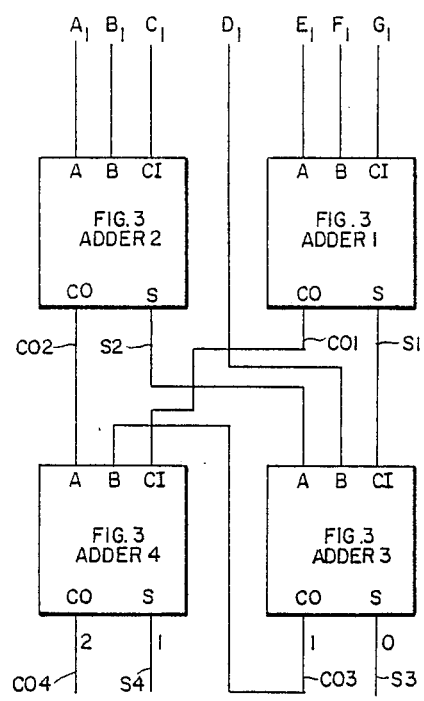
FIG. 6 is a block diagram of a carry-save adder using the adder stages of the invention.

A significant advantage of using adder stages embodying the invention occurs when these adder stages are used in a carry-save adder network of the type shown in FIG. 6. In this type of network, a large number of inputs (e.g. A, B, C, D, E, F, G) to be added, are added in parallel. Binary adder stages embodying the invention enable these inputs to be added with little propagation delay and with strong drive. Each one of adder stage 1, 2, 3 and 4 in FIG. 6 is an adder stage of the type shown in FIG. 3. The outputs C01 and S1 of Adder 1 are produced a time delay $2\tau+d$ after input signals E, F and G are valid. The outputs C02 and S2 of Adder 2 are produced a time delay $2\tau+d$ after input signals A, B and C are valid. The outputs C03 and S3 are produced a time delay $4\tau+2d$ after the signals A, B, C, D, E, F and G become valid; and the outputs C04 and S4 are produced a time delay $6\tau+3d$ after all the input signals become valid.

What is claimed is:

1. A binary adder stage comprising:
    first and second input terminals for the application thereto of first and second binary input signals and a third input terminal for the application thereto of a binary valued carry-input signal;
    means coupled to said first and second input terminals responsive to said first and second input signals for producing: at a first output a first output signal which is the Exclusive-OR function of said first and second input signals; (b) at a second output a second output signal which is the Exclusive-NOR function of said first and second input signals said second output signal being produced in parallel with said first output signal; (c) at a third output a third output signal which is the NAND function of a said first and second input signals, and (d) at a fourth output a fourth output signal which is the NOR function of said first and second input signals;
    a sum output terminal and a carry-output terminal;
    means, coupled between said first and second outputs and said sum output terminal, responsive to said carry-input signal, for passing said first output signal to said sum terminal when the carry-input signal has one binary value and for passing said second output signal to said sum terminal when said carry-input has the other binary value; and
    means coupled between said third and fourth outputs and said carry-output terminal responsive to said carry-input signal for producing the AND function of said first and second input signals at said carry-output terminal when said carry-input signal has one binary value and for producing the OR function of said first and second inputs when said carry-input signal has the other binary value.

2. The combination as claimed in claim 1 wherein said means coupled between said first and second outputs and said sum output terminal includes first and second transmission gates, each transmission gate having a conduction path and control electrode and the conduction path of said first transmission gate being connected between said first output and said sum output terminal and the conduction path of said second transmission gate being connected between said second output and said sum output terminal; and
    wherein said means coupled between said third and fourth outputs and said carry-output terminal includes third and fourth transmission gates, said third transmission gate having its conduction path connected between said third output and said carry-output terminal and said fourth transmission gate having its conduction path connected between said fourth output and said carry-output terminal.

3. The combination as claimed in claim 2 wherein said carry-input signal is coupled to the control electrodes of said first, second, third and fourth transmission gates for, either, turning-on said first and third transmission gates and concurrently, turning-off said second and fourth transmission gates, or turning-off said first and third transmission gates and concurrently turning-on said second and fourth transmission gates.

4. The combination as claimed in claim 1 wherein said means coupled to said input terminals responsive to said first and second input signals includes: (1) a first logic gate for producing said Exclusive-OR function at said first output; (2) a second logic gate for producing said Exclusive-NOR function at said second output; (3) a third logic gate for producing said NAND function at said third output; and (4) a fourth logic gate for producing said NOR function at said fourth output.

5. The combination as claimed in claim 4 wherein each one of said logic gates is comprised of transistors of complementary conductivity type.

6. A binary adder stage comprising:
    first, second and third input terminals for the application thereto of first, second and third binary input signals;
    first means coupled to selected ones of said input terminals responsive to said first and second input signals for producing at a first output a first output signal which is the Exclusive-OR function of said first and second input signals, at a second output a second output signal which is the Exclusive-NOR function of said first and second input signals said first means producing said second output signal in parallel with said first output signal, at a third output a third output signal which is the NAND function of said first and second input signals, and at a fourth output a fourth output signal which is the NOR function of said first and second input signals;
    a sum output terminal and a carry-output terminal;
    second means coupled between said first and second outputs and said sum output terminal, responsive to said third input signal, for passing said first output signal to said sum terminal when said third input signal has one binary value and for passing said second output signal to said sum terminal when said third input has the other binary value; and
    third means coupled between said third and fourth outputs and said carry-output terminal responsive to said third input signal for producing the AND function of said first and second input signals at said carry-output terminal when said third input signal has one binary value and for producing the OR function of said first and second inputs when said third input signal has the other binary value.

7. The combination as claimed in claim 6 wherein said third input signal is a carry-input signal.

8. A binary adder stage comprising:

first and second input terminals for the application thereto of first and second binary input signals and a third input terminal for the application thereto of a binary valued carry-input signal;

first means coupled to said first and second input terminals responsive to said first and second input signals for producing at a first output a first output signal which is the Exclusive-OR function of said first and second input signals, second means coupled to said first and second input terminals for producing at a second output a second output signal, in parallel with the production of said first output signal, which is the Exclusive-NOR function of said first and second input signals, third and fourth means coupled to said first and second input terminals for producing at a third output a third output signal which is the NAND function of said first and second input signals, and at a fourth output a fourth output signal which is the NOR function of said first and second input signals;

a sum output terminal and a carry-output terminal;

means, coupled between said first and second outputs and said sum output terminal, responsive to said carry-input signal, for passing said first output signal to said sum terminal when the carry-input signal has one binary value and for passing said second output signal to said sum terminal when said carry-input has the other binary value; and means coupled between said third and fourth outputs and said carry-output terminal responsive to said carry-input signal for producing the AND function of said first and second input signals at said carry-output terminal when said carry-input signal has one binary value and for producing the OR function of said first and second inputs when said carry-input signal has the other binary value.

* * * * *